United States Patent [19]
Russell

[11] Patent Number: 5,482,026
[45] Date of Patent: Jan. 9, 1996

[54] PRECISION ABRASIVE SAW

[76] Inventor: Karl L. Russell, 526 E. 39 St., Hialeah, Fla. 33013

[21] Appl. No.: 133,857

[22] Filed: Oct. 12, 1993

[51] Int. Cl.⁶ ..................................................... B28D 1/04
[52] U.S. Cl. ........................................ 125/12; 125/13.01
[58] Field of Search .................................. 135/12, 13.01, 135/14, 23.01; 51/34 C, 37, 38; 451/158, 160, 124, 130, 150; 83/483, 485, 523, 613, 859

[56] References Cited

U.S. PATENT DOCUMENTS

| 1,945,490 | 1/1934 | Oldham | 51/34 C |
|---|---|---|---|
| 2,088,402 | 7/1937 | Borck | 51/34 C |
| 2,506,076 | 5/1950 | Garrison | 125/14 |
| 3,745,713 | 7/1973 | Fabre | 51/34 C |
| 3,815,570 | 6/1974 | Story | 125/14 |
| 4,055,918 | 11/1977 | Bralander et al. | 51/34 C |
| 4,428,159 | 1/1984 | Sigetich | 51/92 |
| 4,541,404 | 9/1985 | Dols | 125/14 |
| 4,817,581 | 4/1989 | Trentadue | 125/14 |
| 4,896,647 | 1/1990 | Valva et al. | 125/14 |
| 4,991,354 | 2/1991 | Schweickhardt | 51/78 |
| 5,127,391 | 7/1992 | O'Keefe | 125/13.01 |
| 5,345,831 | 9/1994 | Sandrack | 74/53 |

Primary Examiner—Maurina T. Rachuba

[57] ABSTRACT

An abrasive saw for the cutting of tiles and related materials utilizing an adjustable V-Track & Wheel carriage system to greatly improve precision and portability. The V-Track & Wheel abrasive saw provides a greater cutting area for large size workpieces, such as 18 inches or larger, as well as for cutting diagonals and corners on such pieces without damaging them. By positioning the blade cutting plane parallel to the plane of the carriage movement, precision is maintained with time even as the V-Track & Wheel wears. The saw utilizes a standard off the shelf, adjustable V-Track & Wheel assembly. This assembly is adjustable by means of an eccentric bushing system thereby maintaining precision integrity throughout the saws' working life. The V-Track & Wheel carriage system is mounted on a horizontal beam above the cutting table thereby providing a better view to work and avoiding accumulation of cutting dust particles on the V-Track & Wheel carriage system, prolonging its life and precision. The V-Track & Wheel abrasive saw is light enough to be carried by one or two men.

2 Claims, 5 Drawing Sheets

PRECISION ABRASIVE SAW

TECHNICAL FIELD

The present invention relates to a lightweight portable abrasive saw machine utilizing an adjustable locking v-tracking system including v-wheel rollers and v-wheel tracks mounted on a rigid beam for the precision cutting of small and large tiles and related materials.

BACKGROUND OF THE INVENTION

The construction and related industries today install increasing amounts of tiles and related materials, with larger size materials becoming more popular and with more demand for finer detail in the finished product. The trend for larger size materials has created a vacuum for a precision saw that can cut all size workpieces but in particular, pieces 18 inches or larger, as well as cutting diagonals and corners on such pieces without damaging them. Since it's necessary to bring a saw on such jobs, it is also important that the saw be light enough to be carried by one or two men and that it not take up too much space. Therefore, there is a need for a lightweight, relatively inexpensive, precision cutting abrasive saw for large and small workpieces that exceeds the accuracy of the much heavier and costlier saws available on the market today.

Presently, many tile cutting machines incorporate mounting the workpiece on a roller and track sliding table, whereupon the table is pushed against a fixed abrasive saw. The most important disadvantage to these systems is that generally, the table rests by gravity unlocked to the tracks so that skewing of the table plane occurs relative to the plane of the cutting saw, hence uneven cutting. The present invention avoids this by orienting the carriage plane parallel to the saw cutting plane. Another disadvantage to these systems is that the rollers and tracks slide under the fixed saw accumulating tile dust particles. This produces grinding effects which wear out the rollers and tracks. Since there is no adjustable locking for the rollers and tracks, there is further decrease in cutting precision. The present invention mounts the tracking system above and away from the saw cutting path. Another obvious limitation to these systems is that half the table supports a non cutting area wasting half the machine and increasing half its weight. This also restricts the size of the workpieces that can be used. For larger workpieces it is necessary to cut through half the workpiece, remove the workpiece, rotate 180 degrees, secure, then cut again. Where these systems limit the length and width of a workpiece, the present invention limits only one dimension while the other dimension is open. For example, a 12 inch sliding table system requires a 12 inch non cutting area plus the saw cutting area plus the cutting through area, say another 12 inches, for a total of about 30 inches to cut a 12 inch workpiece. The other dimension will also be limited by the width of the table. With the same surface area as the 12 inch sliding table saw, the present invention will cut a 25.5 inch diagonal (or larger) of an 18 inch tile while the other dimension remains unhindered.

Other systems presently in use are abrasive saws that are mounted on a roller bearing(s) with said bearing(s) supporting said saw while rolling on a track for a cutting path. In their present form these systems have one main disadvantage: as the roller bearings tend to wear in a normal orientation, the saw tends to skew from side to side causing irregular cuts. This occurs when the plane of the roller bearing wear is perpendicular to the plane of saw cut. In the tool and die trade this is known as bell-mouth.

The present invention overcomes all these limitations by incorporating an adjustable locking, V-Tracking System, where the planes of the bearing wear and carriage are parallel to the plane of the saw cut so that carriage skewing will occur only in a vertical direction, thereby unaffecting the accuracy of the workpiece cut. Also, as the bearings wear, the adjustable locking bushings will compensate for wear.

The following prior art references typify the aforementioned table carriage systems:

U.S. Pat. Nos. 5,127,391 and 4,940,038 by O'Keefe: Tile and Marble Cutting Apparatus and Method
  wherein the improvement comprises a motor support wherein the motor may be moved laterally on the table support between preselected cutting positions.

U.S. Pat. No. 4,991,354 by Schweickhardt: Abrasive Saw Adjustable Workpiece Supporting Frame
  said longitudinal means comprising a series of spaced freely turning rollers mounted to said parallel rails for rollingly supporting the work piece thereon and for permitting ease of movement of the workpiece toward and away from the abrasive saw.

U.S. Pat. No. 4,428,159 by Sigetich: Portable Direct Drive Abrasive Saw
  a table reciprocally mounted on said rails supporting said work to be cut and being movable in a generally horizontal direction toward and away from said saw blade from a retracted position in which said table and the work thereon is clear of said saw blade and a cutting position in which said saw blade cuts through said work as the latter is moved past said saw blade.

The following prior art references typify the roller track systems:

U.S. Pat. No. 4,817,581 by Trentadue: Adjustable Support for Cutting Apparatus
  an apparatus for adjustably supporting a cutting tool or the like and particularly relates to an adjustable four bar linkage mounted on a linear bearing for supporting a cutting tool.

U.S. Pat. No. 4,541,404 by Dols: Tile Cutting Apparatus
  a tile cutting apparatus comprising a work table adapted to support a tile to be cut, a guide and support track located beneath and/or to one side of the top of the work table and parallel to said one side thereof, a carriage guided and supported by the track and a cut off saw supported at a predetermined height above the table by a cantilevered arm extending from the carriage.

BRIEF SUMMARY OF INVENTION

The main objective of the present invention is to provide a lightweight, relatively inexpensive, adjustable, precision cutting abrasive saw for large and small tiles and similar workpieces. This objective is attained by the incorporation of an adjustible V-Track & Wheel carriage system. The V-Track & Wheel carriage system is made up of 2 V-Tracks and 4 roller bearings with 2 adjustable eccentric bushings and 2 fixed concentric bushings. The V-Track & Wheel carriage system is fixed to a horizontally supported beam. The result of incorporating a V-Track & Wheel carriage sytem to an abrasive saw is a lighter, less expensive, far more precise machine than those that can presently be found today.

DETAILED DESCRIPTION OF DRAWINGS

Figure 1:
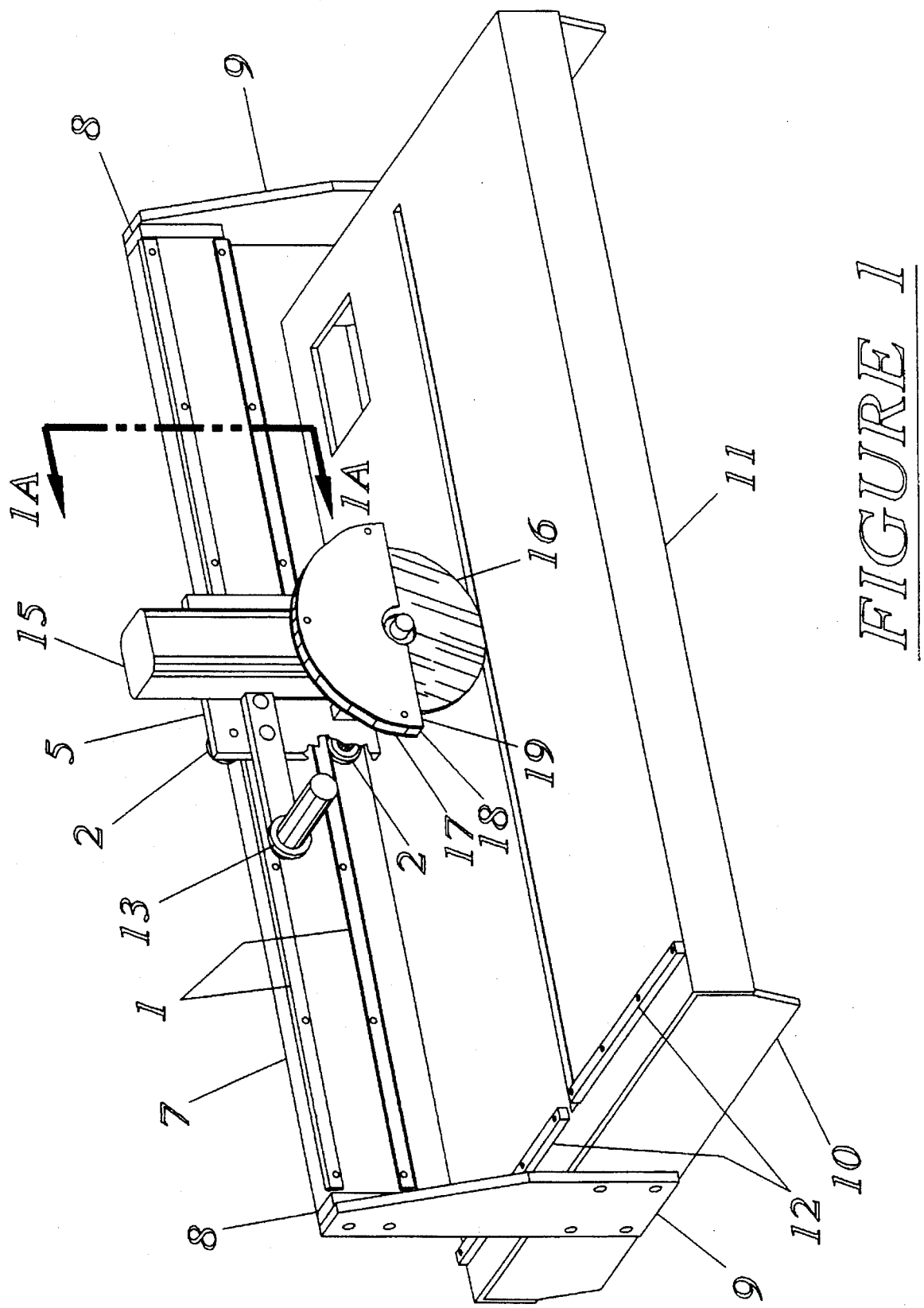
FIG. 1 is a perspective view of the preferred embodiment of the V-Track & Wheel abrasive saw.

FIG. 1 is a perspective view of the assembled preferred embodiment of the present invention. Most importantly it shows the V-track & Wheel carriage system composed of two V-Wheel Tracks #1, V-wheels #2 (four included, two not seen in this view), the carriage #5 and the V-track fixed to the beam #7. This view also shows how the saw #16 is located and fixed relative to the direct displacement motor #15. Handle #13 manually slides the entire carriage assembly, motor and saw. Beam end plates #8 a provided to facilitate mounting the beam to vertical supports #9 which are in turn bolted to the table end plates #10. The table #11 comprises a front, top and rear. On the top of the table are the front squaring blocks #12 used to square the workpiece.

Figure 1A:
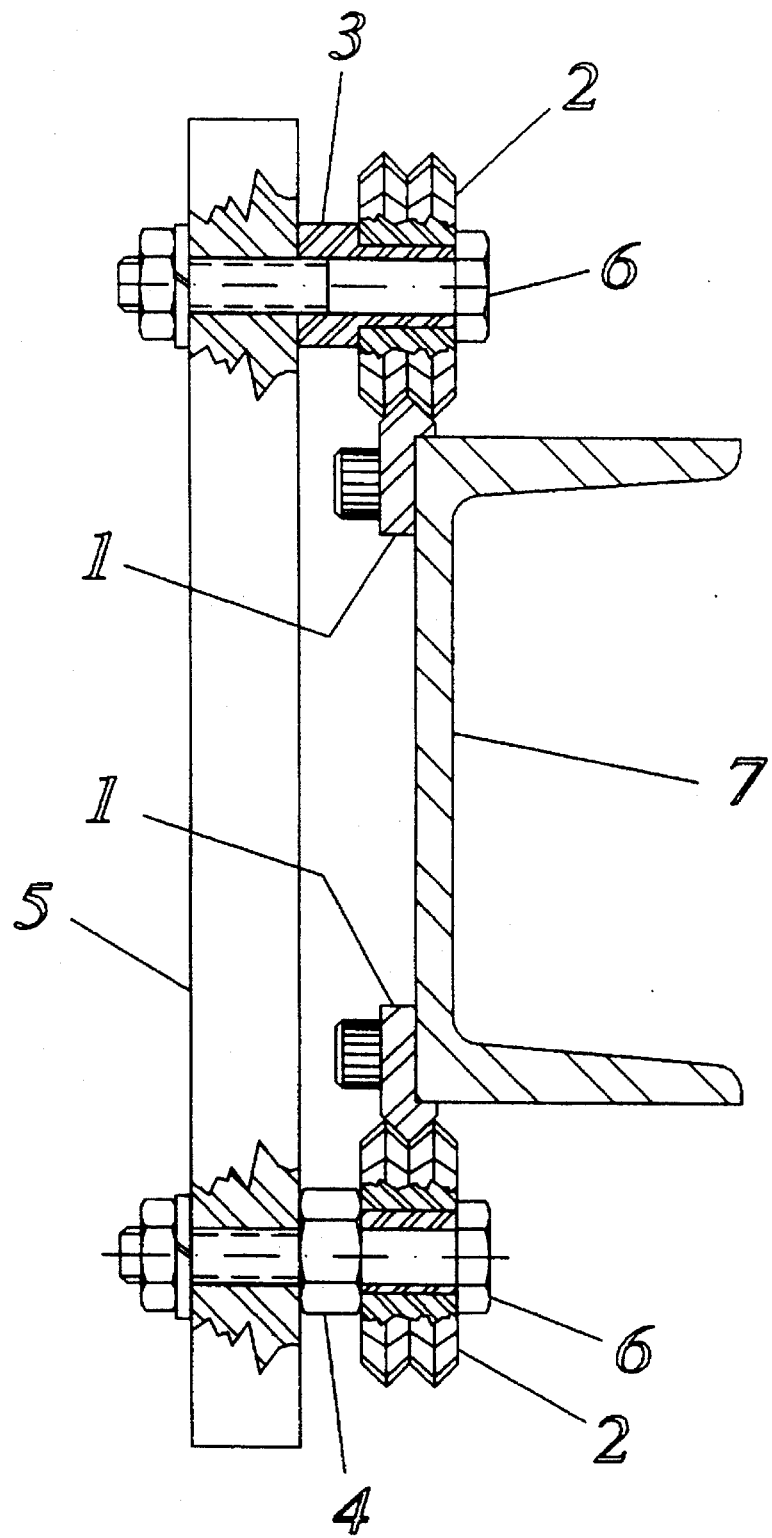
FIG. 1A is a cross section of the V-Track & Wheel carriage system.

FIG. 1A is a cross section of the V-wheel & Track carriage system. It consists of the carriage #5 on which is bolted through 4 V-wheels. The two upper V-wheels having concentric bushings #3 between carriage #5 and V-wheels, and the two lower V-wheels having eccentric bushings #4 between carriage and V-Wheels. The eccentric bushings are used to adjust the clearance of the V-wheels to the track.

Figure 2:
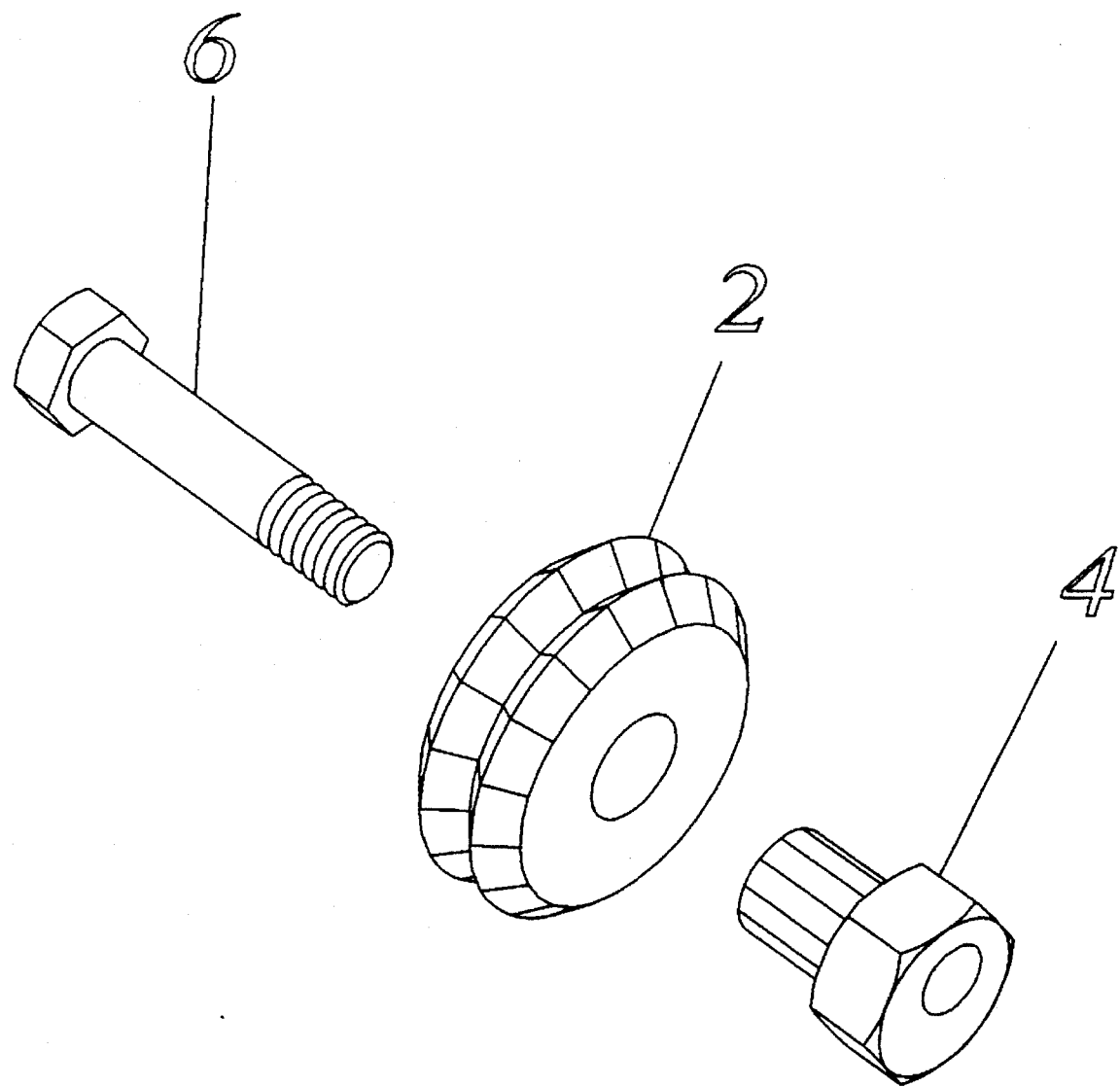
FIG. 2 is a perspective view of the adjustible eccentric bushing and bearing necessary in precision adjusting.

FIG. 2 is a perspective view showing the adjustible mechanism for the V-Track and Wheel system. Eccentric bushing #4 press fits into V-Wheel #2 leaving exposed the hexagonal head to serve as a spacer for adjustment with appropriate tool (e.g. wrench). The mounting bolts #6 (two upper) fit snugly through bushing eccentric holes and V-Wheels. By rotating the eccentric bushing on its mounting bolt, the clearance between the V-Wheel and V-Track can be adjusted.

Figure 2A:
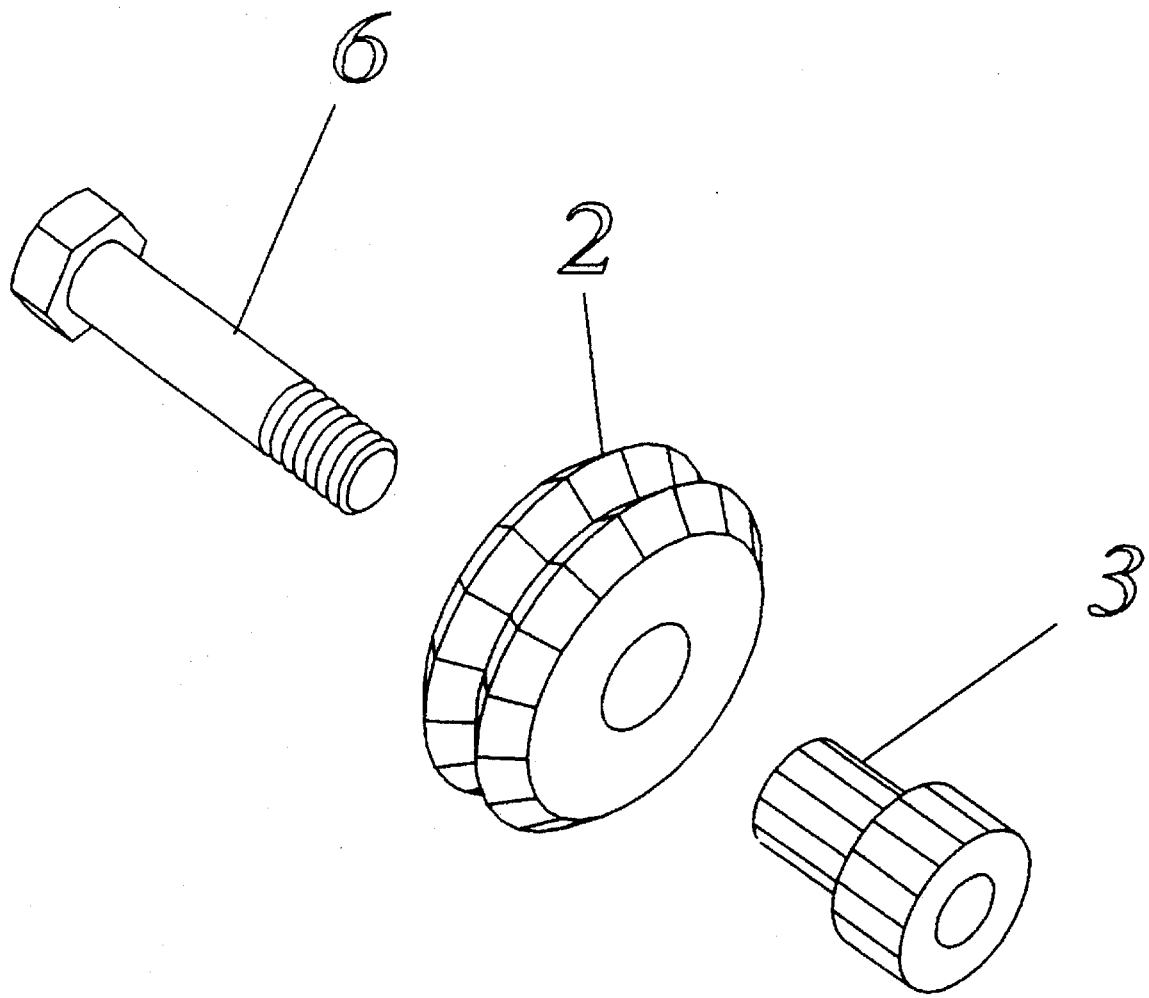
FIG. 2A is a perspective view of the fixed concentric bushing and bearing.

FIG. 2A is a perspective view of the stationary concentric bushing #3 that press fits into V-Wheel #2, also showing bolt #6 which fits snugly through the concentric bushing and V-Wheel.

Figure 3:
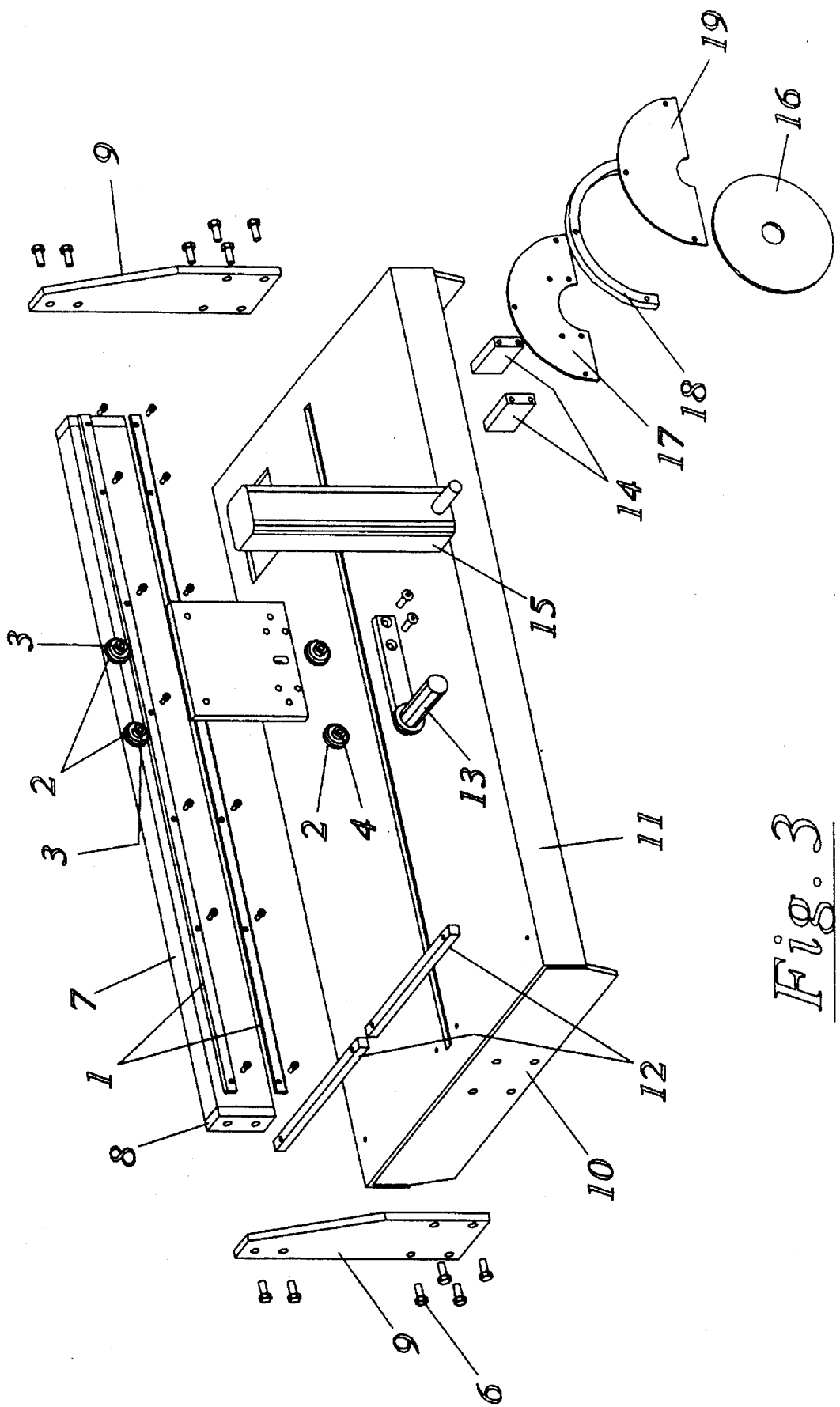
FIG. 3 is an isometric exploded assembly view of the V-Track & Wheel abrasive saw showing all parts.

FIG. 3 is an isometric exploded drawing of the V-Track and Wheel abrasive saw showing assembly of the preferred embodiment.

I claim:

1. A precision abrasive saw comprising
    a table;
    a v-track & v-wheel carriage system mounted on a horizontal beam above said table including
        a motor,
        an abrasive saw coupled to the motor,
        a v-track fixed to the length of the horizontal beam,
        a plurality of v-wheels horizontally fixed to roll on v-track;
        a carriage, including a handle for manually tracking the carriage, said carriage having a first side for mounting the motor and abrasive saw to cut a horizontal length perpendicular to the table, and said carriage having a second side for mounting v-wheels to the carriage;
    a precision means to adjust clearance between v-wheels and v-track.

2. The precision abrasive saw of claim 1 wherein the precision means comprises
    a plurality of concentric and eccentric bushings press fit into the v-wheels and mounted to the carriage, the bushings, v-wheels and carriage bolted therethrough, the eccentric bushings rotatingly adjusting the clearance between the v-wheels and v-track.

* * * * *